United States Patent
Phalake et al.

(10) Patent No.: US 8,725,545 B2
(45) Date of Patent: May 13, 2014

(54) NUTRITIONAL MONITORING AND FEEDBACK

(75) Inventors: Sumier Phalake, Atlanta, GA (US); William P. Shaouy, Atlanta, GA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/466,270

(22) Filed: May 8, 2012

(65) Prior Publication Data

US 2013/0304529 A1 Nov. 14, 2013

(51) Int. Cl.
*G06Q 10/00* (2012.01)
*G06Q 30/00* (2012.01)

(52) U.S. Cl.
USPC .............. 705/7.11; 705/28; 235/385

(58) Field of Classification Search
USPC .............. 705/7.11, 3, 7.38, 7.41, 28; 235/385
See application file for complete search history.

(56) References Cited

U.S. PATENT DOCUMENTS

| | | | |
|---|---|---|---|
| 7,299,982 B2* | 11/2007 | Kreiner et al. | 235/385 |
| 7,934,649 B2 | 5/2011 | Kreiner et al. | |
| 8,115,623 B1* | 2/2012 | Green | 340/539.13 |
| 2002/0027164 A1* | 3/2002 | Mault et al. | 235/462.46 |
| 2006/0015371 A1* | 1/2006 | Knauf et al. | 705/3 |
| 2007/0043621 A1* | 2/2007 | Collins et al. | 705/14 |
| 2010/0019905 A1* | 1/2010 | Boddie et al. | 340/572.1 |
| 2011/0131105 A1* | 6/2011 | Aonuma et al. | 705/24 |
| 2012/0077153 A1* | 3/2012 | Livny | 434/127 |
| 2013/0049931 A1* | 2/2013 | Baym et al. | 340/10.1 |
| 2013/0105565 A1* | 5/2013 | Kamprath | 235/375 |

FOREIGN PATENT DOCUMENTS

JP 2008219805 A 9/2008

OTHER PUBLICATIONS

Masters, A. Humancentric applications of RFID: the current state of development. University of Wollongong Research Online, Information and Communication Technology(Honours). 2003, 120p.*
Shroff, Geeta. Wearable Context-Aware Food Recognition for Nutrition Monitoring. Undergraduate Thesis, School of Computer Science, Carnegie Mellon University. Pittsburgh, PA. 2008.*
Spink, John and Moyer, Douglas. Defining the Public Health Threat of Food Fraud. Institute of Food Technologists, Journal of Food Science, vol. 76, Nr. 9, 2011.*

* cited by examiner

*Primary Examiner* — Stephanie Delich
(74) *Attorney, Agent, or Firm* — Schmeiser, Olsen & Watts; Matthew Chung (57) ABSTRACT

A method and system for tracking items is provided. The method includes retrieving, from empty food packages in garbage containers, data associated with multiple attributes of multiple consumed food products from the empty food packages. Package data objects associated with the data are generated. The package data objects include identification numbers and attributes associated with the empty food packages. The package data objects are transmitted to a central processing server for generation of aggregated data. The aggregated data is analyzed with respect to nutritional content of the multiple consumed food products.

17 Claims, 10 Drawing Sheets

| Packages | |
|---|---|
| PK | ID |
| | Volume 710<br>Serving Size<br>Calories<br>Fat grams<br>Sugar grams<br>Fiber grams<br>Vitamin A %RDA per serving<br><br>Added time<br>Deleted time<br>RAS ID |

NUTRITIONAL MONITORING AND FEEDBACK

FIELD

The present invention relates to a method and associated system for tracking consumption of food products.

BACKGROUND

Monitoring individuals with respect to products typically comprises an inaccurate process with little flexibility. Product management may include a complicated process that may be time consuming and require a large amount of resources. Accordingly, there exists a need in the art to overcome at least some of the deficiencies and limitations described herein.

SUMMARY

The present invention provides a method comprising: retrieving, by a computer processor of a regional computing system from a first plurality of empty food packages in a first garbage container, first data associated with first attributes of first consumed food products from the first plurality of empty food packages; retrieving, by the computer processor from a second plurality of empty food packages in a second garbage container, second data associated with second attributes of second consumed food products from the second plurality of empty food packages, wherein the first garbage container is located in a location differing from a location of the second garbage container; generating, by the computer processor, a first package data object associated with the first data, wherein the first package data object comprises a first identification number and the first attributes; generating, by the computer processor, a second package data object associated with the second data, wherein the second package data object comprises a second identification number and the second attributes; transmitting, by the computer processor to a central processing server, the first package data object and the second package data object, wherein the central processing server generates aggregated data from the first package data object and the second package data object, wherein the central processing server performs an analysis of the first attributes and the second attributes of the aggregated data with respect to nutritional content of the first consumed food products and the second consumed food products, and wherein the central processing server generates analysis data based on results of the analysis; and receiving, by the computer processor from the regional computing system, the analysis data.

The present invention provides a computer program product, comprising a computer readable storage device storing a computer readable program code, the computer readable program code comprising an algorithm that when executed by a computer processor of a regional computing system implements a method, the method comprising: retrieving, by the computer processor from a first plurality of empty food packages in a first garbage container, first data associated with first attributes of first consumed food products from the first plurality of empty food packages; retrieving, by the computer processor from a second plurality of empty food packages in a second garbage container, second data associated with second attributes of second consumed food products from the second plurality of empty food packages, wherein the first garbage container is located in a location differing from a location of the second garbage container; generating, by the computer processor, a first package data object associated with the first data, wherein the first package data object comprises a first identification number and the first attributes; generating, by the computer processor, a second package data object associated with the second data, wherein the second package data object comprises a second identification number and the second attributes; transmitting, by the computer processor to a central processing server, the first package data object and the second package data object, wherein the central processing server generates aggregated data from the first package data object and the second package data object, wherein the central processing server performs an analysis of the first attributes and the second attributes of the aggregated data with respect to nutritional content of the first consumed food products and the second consumed food products, and wherein the central processing server generates analysis data based on results of the analysis; and receiving, by the computer processor from the regional computing system, the analysis data.

The present invention provides a computer system comprising a computer processor coupled to a computer-readable memory unit, the memory unit comprising instructions that when executed by the computer processor of a regional computing system implements a method comprising: retrieving, by the computer processor from a first plurality of empty food packages in a first garbage container, first data associated with first attributes of first consumed food products from the first plurality of empty food packages; retrieving, by the computer processor from a second plurality of empty food packages in a second garbage container, second data associated with second attributes of second consumed food products from the second plurality of empty food packages, wherein the first garbage container is located in a location differing from a location of the second garbage container; generating, by the computer processor, a first package data object associated with the first data, wherein the first package data object comprises a first identification number and the first attributes; generating, by the computer processor, a second package data object associated with the second data, wherein the second package data object comprises a second identification number and the second attributes; transmitting, by the computer processor to a central processing server, the first package data object and the second package data object, wherein the central processing server generates aggregated data from the first package data object and the second package data object, wherein the central processing server performs an analysis of the first attributes and the second attributes of the aggregated data with respect to nutritional content of the first consumed food products and the second consumed food products, and wherein the central processing server generates analysis data based on results of the analysis; and receiving, by the computer processor from the regional computing system, the analysis data.

The present invention advantageously provides a simple method and associated system capable of monitoring individuals with respect to products.

DETAILED DESCRIPTION

Figure 1:
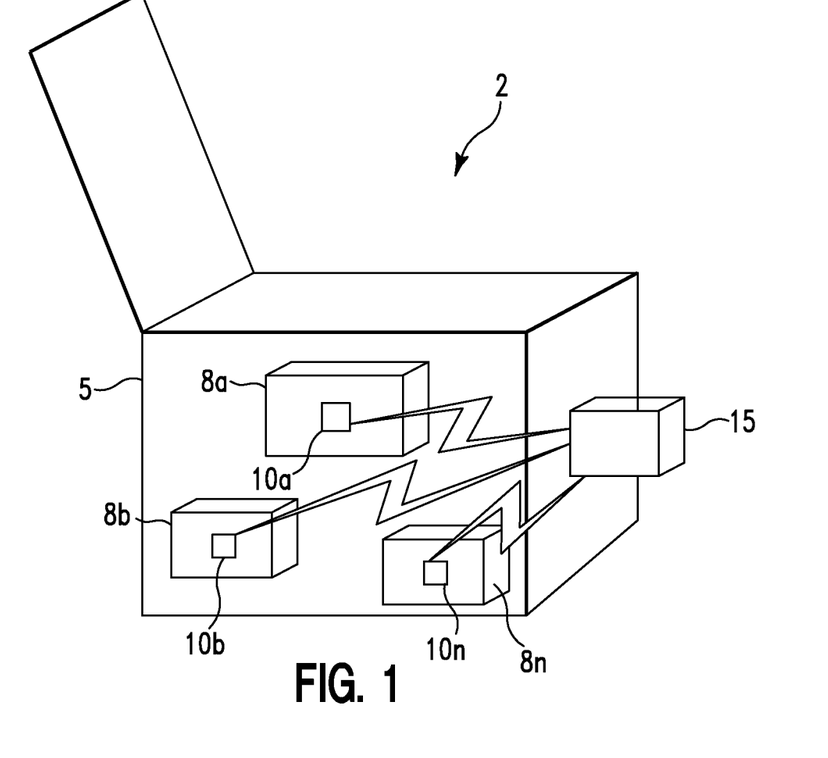
FIG. 1 illustrates a system for automatically tracking use of food constituents in a food serving establishment to determine a nutritional value of served food, in accordance with embodiments of the present invention.

FIG. 1 illustrates a system 2 for automatically tracking use of served food in a food serving establishment to determine a nutritional value, in accordance with embodiments of the present invention. System 2 comprises empty food packages (or containers) 8a . . . 8n, located within a garbage container 5 (e.g., a dumpster), and a scanner/transmitter computer 15. Each of empty food packages 8a . . . 8n includes an attached data retrieval/transmission device 10a . . . 10n (e.g., RFID tags) that include data describing attributes of consumed food products from empty food packages 8a . . . 8n. Attributes may include, inter alia, serving size, volume, calories, vitamin content, etc of the consumed food products from empty food packages 8a . . . 8n.

System 2 enables a process for scanning RF tag (e.g., data retrieval/transmission device 10a . . . 10n) equipped packages (e.g., empty food packages 8a . . . 8n) of consumed food products. The scanning process uses RF scanners (scanner/transmitter computer 15) located in close proximity to a garbage container (e.g., garbage container 5) belonging to a food serving establishment (a restaurant, a cafeteria, etc) to determine a nutritional value of the consumed food products. System 2 correlates data scanned by the RF scanners in the garbage container with images captured by image capturing devices (e.g., a camera) at check-out lines of the food serving establishment to validate the data scanned by the RF scanners.

System 2 enables a process for tracking a nutritional value of restaurant/cafeteria food products at a point of use. Additionally, system 2 enables a process for validating an authenticity of collected data by tracking a nutritional value of meals served at the point of consumption. Point of use is defined herein as a kitchen where packaging material (e.g., empty food packages 8a . . . 8n) for large quantities of food and drink are removed before the food is prepared for consumption. The packing material for the food delivered to the restaurants/cafeterias may be equipped with RFID tags (e.g., data retrieval/transmission device 10a . . . 10n). Each RFID tag may contain data associated with a food type and quantity as well as details associated with a nutritional content of the food. Dumpsters (e.g., garbage container 5) for the food packages may be equipped with chip readers and wireless transmitters (scanner/transmitter computer 15). When an RFID enhanced package is discarded into a properly equipped dumpster, the chip reader may read contents of the RFID tag and wirelessly transmit the contents to a server for processing. During a specified time period (e.g., over the course of a day) data is gathered (by the server) describing a type and quantity of food that has been used to prepare meals during the specified time period. The server processes the data and calculates a nutritional quality of the food. The nutritional quality of the food may be used to evaluate a health value of the food.

System 2 additionally enables a process for determining a possibility of fraud or discrepancies between food that has been unpacked and food that has been actually served (i.e., determining a match). For example, cameras (e.g., image capturing devices 404a . . . 404n as described, infra, with respect to FIG. 4) may be equipped at a point of consumption (e.g., at a checkout line location). The cameras may be programmed to take an image (i.e., a picture) of a tray (of food) each time a tray is detected. The image is wirelessly transmitted to a processing server comprising software for performing an image recognition and detection process associated with a type of food on the tray thereby identifying a type of food and size of a portion of the food. The image recognition and detection process allows system 2 to estimate an amount, type, and nutritional value of all food served over the course of a day. The estimate may be tallied with an initial estimate at the point of use. System allows for tracking and verification of a nutritional value of the food served in restaurants/cafeterias and may determine incentives to the restaurants/cafeterias for providing healthy meals to customers.

System 2 tracks overall decisions associated with nutrition determined at an institutional level. Additionally, system 2 provides a method for verifying if any food that has been unpacked comprises a same food that has been served in order to prevent fraud. System 2 may enable RFID technology to scan data and transmit the data to a server for processing resulting in management and tracking of nutritional content. RFID tags may be embedded within food packages. Each RFID tag may include details associated with contents/nutritional information of the food packages. For example, when an individual discards an empty food package into the garbage, an RFID tag reader may scan data on stored within the RFID tag. Multiple data read from the RFID tags over a period of time may be required to be consolidated and interpreted and therefore, garbage bins may be equipped with wireless transmitters that wirelessly transmit data read from RFID tags to regional aggregating servers. The regional aggregating servers may store and transmit the data to a central procession server for analysis.

Figure 2:
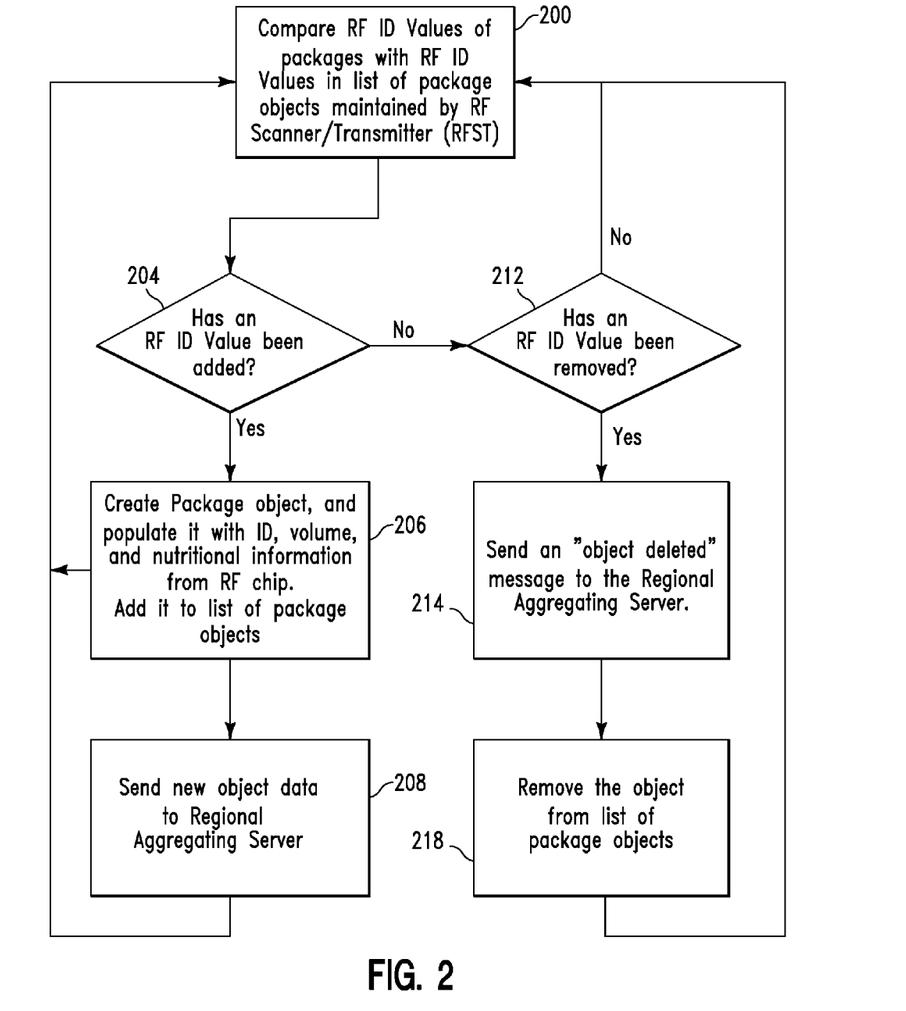
FIG. 2 illustrates an algorithm detailing a process flow enabled by the system of FIG. 1 for determining when an empty food package has been added or removed, in accordance with embodiments of the present invention.

FIG. 2 illustrates an algorithm detailing a process flow enabled by system 2 of FIG. 1 for determining when an empty food package has been added or removed, in accordance with embodiments of the present invention. In step 200, RFID values of empty food packages (in a garbage container such as garbage container 5 in FIG. 1) are compared to a list RFID values for package objects maintained by a scanner/transmitter computer such as a scanner/transmitter computer 15 of FIG. 1. In step 204, it is determined if an RFID value has been added (by disposing of an empty food package in the dumpster).

If in step 204, it is determined that an RFID value has been added then in step 206, a package object is generated and populated with (i.e., from the associated RFID tag data retrieved) an RFID tag ID and a volume and nutritional information of consumed food from an associated empty food package. The package object is added to a list of package objects. In step 208, the package object is transmitted to a regional aggregating server (e.g., any of regional servers 410a . . . 410n if FIG. 4 as described, infra) and step 200 is repeated.

If in step 204, it is determined that an RFID value has not been added then in step 212, it is determined if an RFID value has been removed. If in step 212, it is determined that an RFID value has not been removed then step 200 is repeated. If in step 212, it is determined that an RFID value has been removed then in step 214, an object deleted message is transmitted to the regional aggregating server. In step 218, an associated package object is removed from the list of package objects and step 200 is repeated.

Figure 3:
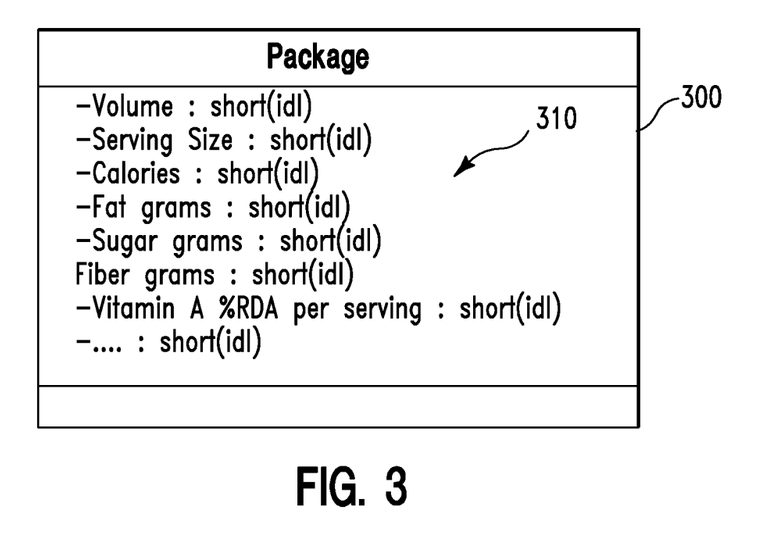
FIG. 3 illustrates an example of a package object generated in the algorithm of FIG. 2, in accordance with embodiments of the present invention.

FIG. 3 illustrates an example of a package object 300 generated in the algorithm of FIG. 2, in accordance with embodiments of the present invention. Package object 300 comprises a listing of various attributes 310 of consumed food that was in a food package associated with package object 300. For example, attributes 310 may include, inter alia, volume, serving size, calories, grams of fat, sugar grams, fiber grams, vitamins, etc.

Figure 4:
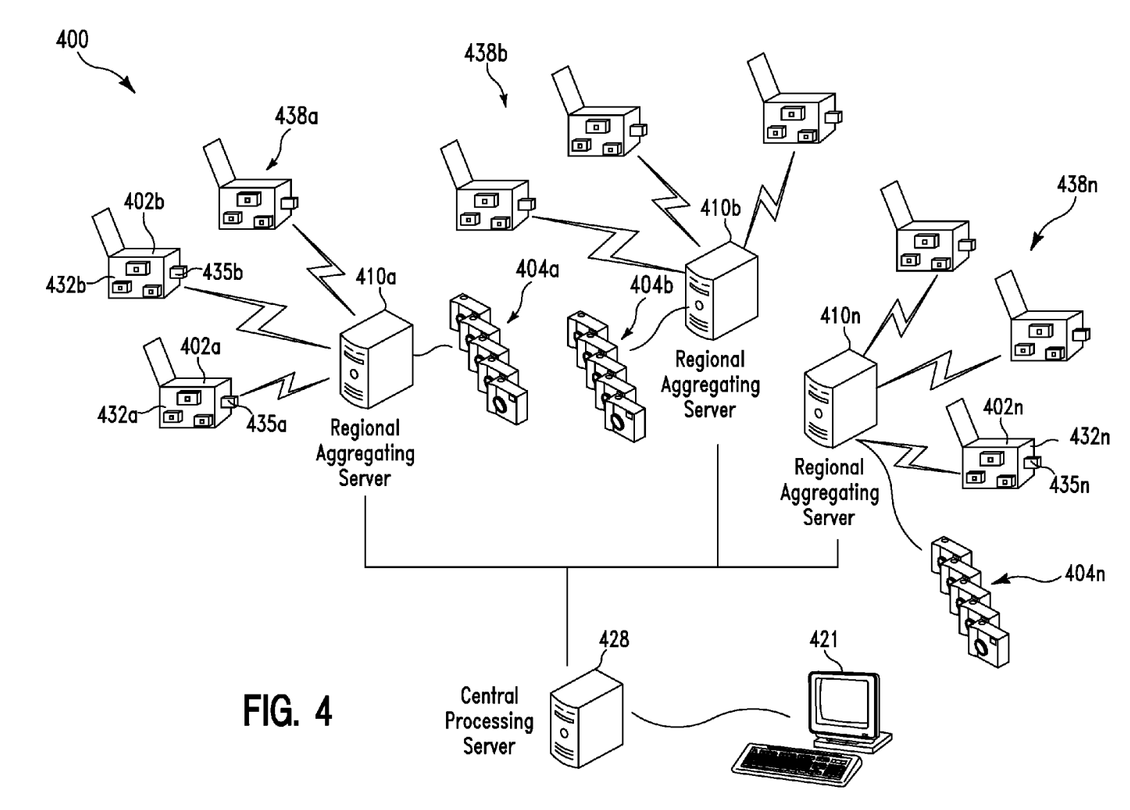
FIG. 4 illustrates an example of an aggregating system for automatically tracking use of food constituents in a food serving establishment to determine a nutritional value of served food, in accordance with embodiments of the present invention.

FIG. 4 illustrates an example of an aggregating system 400 for automatically tracking use of food products in a food serving establishment to determine a nutritional value of served food, in accordance with embodiments of the present invention. System 400 comprises empty food packages (or containers) 432a . . . 432n, located within garbage containers 402a . . . 402n each comprising one of scanner/transmitter computers 435a . . . 435n. Each of empty food packages 432a . . . 432n includes an attached data retrieval/transmission device (as described with reference to FIG. 1) that include data describing attributes of consumed food products from empty food packages 432a . . . 432n. Groups 438a . . . 438n of garbage containers 402a . . . 402n comprising one of scanner/transmitter computers 435a . . . 435n and groups of image capturing devices 404a . . . 404n (e.g., digital cameras) are communicatively coupled to regional aggregating servers 410a . . . 410n. Regional aggregating servers 410a . . . 410n are communicatively coupled to a central processing server 428 for data aggregation and processing. Reports associated with the data aggregation and processing may be presented to a user via a monitor 421.

Figure 5:
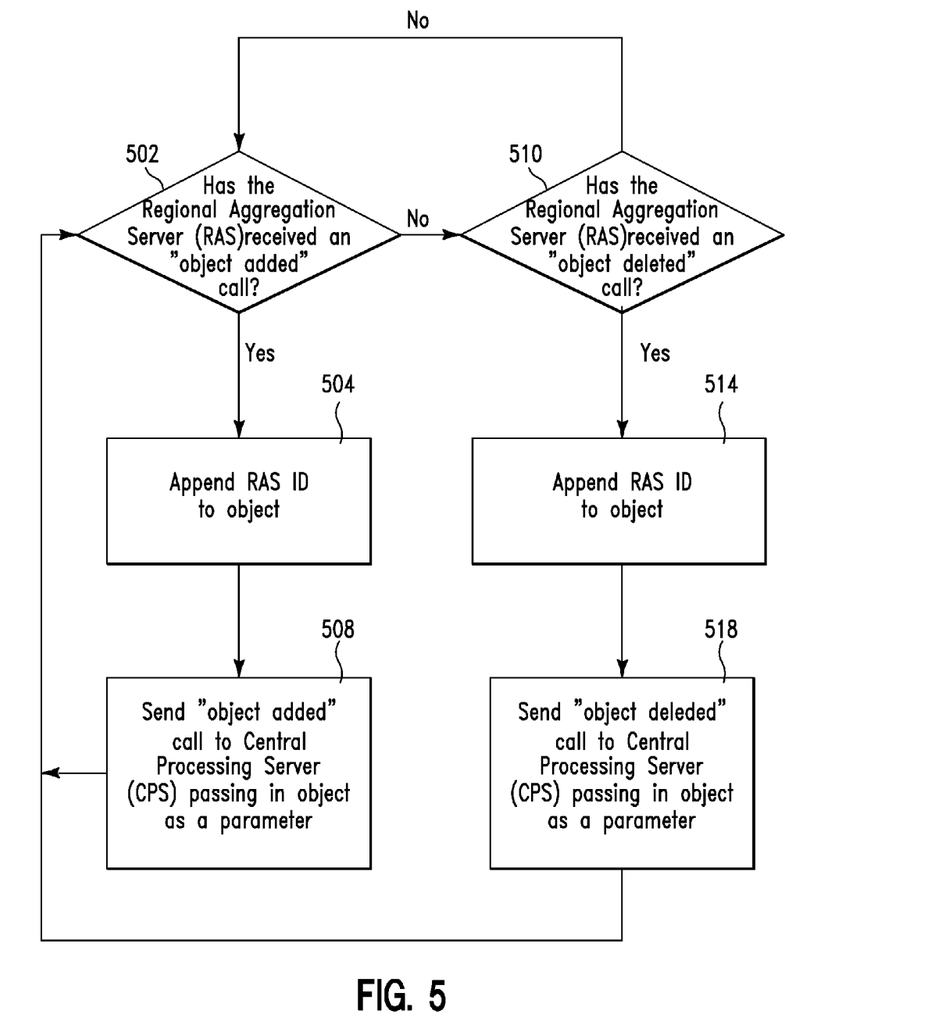
FIG. 5 illustrates an algorithm detailing a process flow enabled by the regional aggregating servers of FIG. 4, in accordance with embodiments of the present invention.

FIG. 5 illustrates an algorithm detailing a process flow enabled by regional aggregating servers 410a . . . 410n of FIG. 4, in accordance with embodiments of the present invention. In step 502, it is determined if a regional aggregating server (of regional aggregating servers 410a . . . 410n) has received an object added call.

If in step 502, it is determined that the regional aggregating server has received an object added call then in step 504, an ID for the regional aggregating server is added to an object associated with the regional aggregating server. In step 508, an object added call is transmitted to a central processing server (e.g., central processing server 428 of FIG. 4) as a parameter and step 502 is repeated.

If in step 502, it is determined that the regional aggregating server has not received an object added call then in step 510, it is determined if the regional aggregating server has received an object deleted call. If in step 510, it is determined that the regional aggregating server has not received an object deleted call then step 502 is repeated. If in step 510, it is determined that the regional aggregating server has received an object deleted call then in step 514, an ID for the regional aggregating server is added to the object associated with the regional aggregating server. In step 518, an object deleted call is transmitted to the central processing server (as a parameter) and step 502 is repeated.

Figure 6:
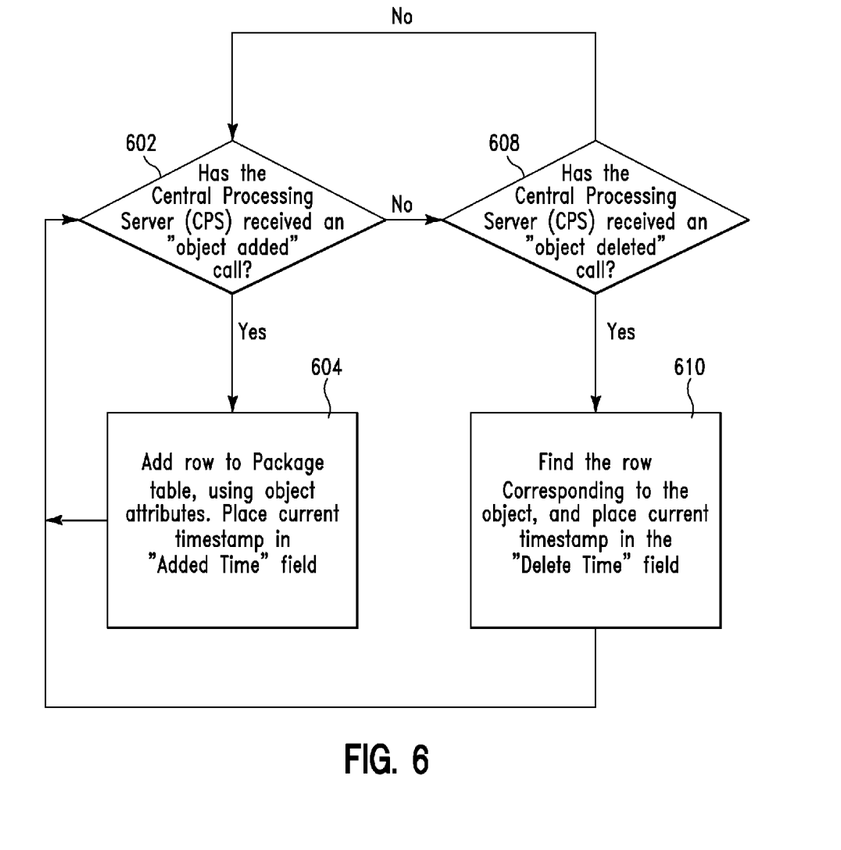
FIG. 6 illustrates an algorithm detailing a process flow enabled by the central processing server of FIG. 4, in accordance with embodiments of the present invention.

FIG. 6 illustrates an algorithm detailing a process flow enabled by central processing server 428 of FIG. 4 for aggregating and analyzing regional aggregating server activity, in accordance with embodiments of the present invention. In step 602, it is determined if the central processing server has received an object added call. If in step 602, it is determined that the central processing server has received an object added call then in step 604, a row is added to an object package table and a current timestamp is placed in an added time field and step 602 is repeated. If in step 602, it is determined that the central processing server has not received an object added call then in step 608, it is determined if the central processing server has received an object deleted call. If in step 608, it is determined that the central processing server has not received an object deleted call then step 602 is repeated. If in step 608, it is determined that the central processing server has received an object deleted call then in step 610, a row corresponding to an object package table is located and a current timestamp is placed in an delete time field.

Figure 7:
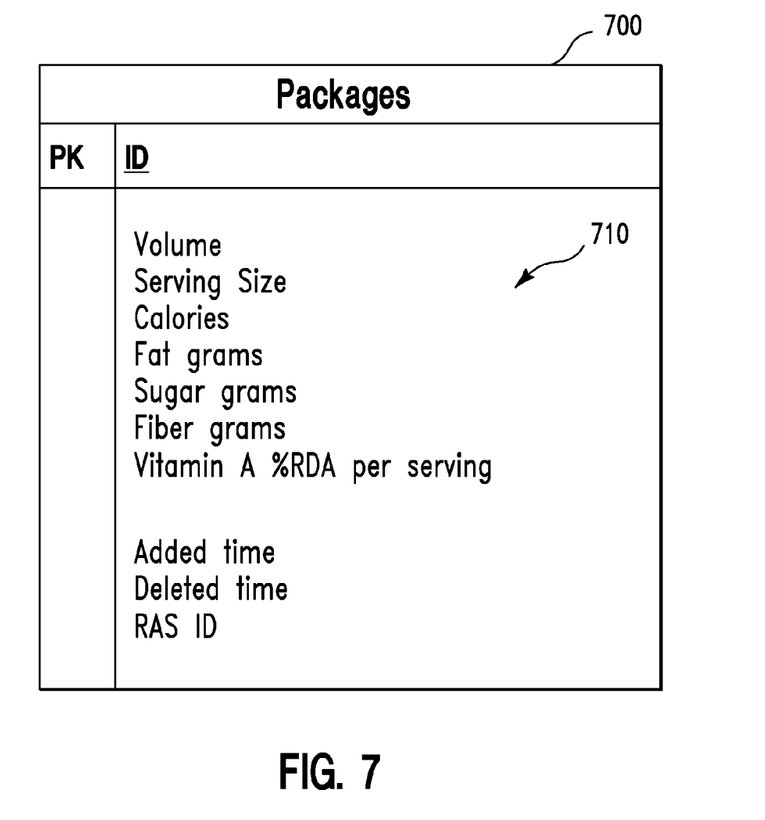
FIG. 7 illustrates an example of a package table generated in the algorithm of FIG. 6, in accordance with embodiments of the present invention.

FIG. 7 illustrates an example of a package table 700 generated by the algorithm of FIG. 6, in accordance with embodiments of the present invention. Package table 700 comprises a listing of various attributes 710 of consumed food that was in a food package associated with package table 700. For example, attributes 710 may include, inter alia, volume, serving size, calories, grams of fat, sugar grams, fiber grams, vitamins, added time, deleted time, RAS ID, etc.

Figure 8:
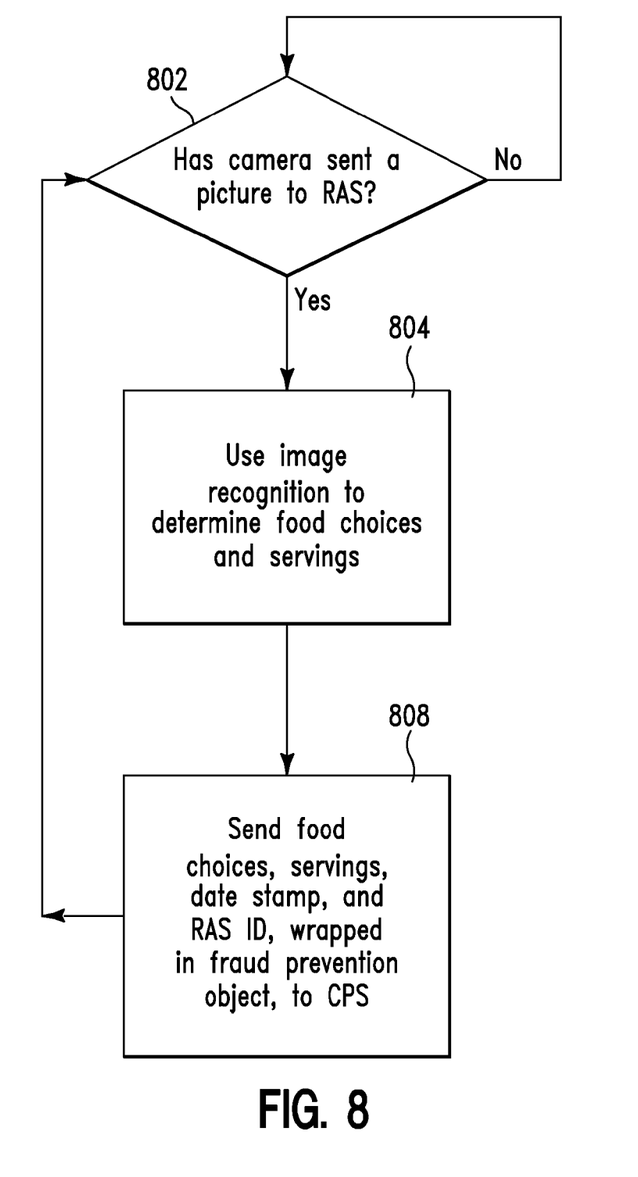
FIG. 8 illustrates an algorithm detailing a process flow enabled by the system of FIG. 4 for enabling a fraud prevention process, in accordance with embodiments of the present invention.

FIG. 8 illustrates an algorithm detailing a process flow enabled by system 400 of FIG. 4 for enabling a fraud prevention process, in accordance with embodiments of the present invention. The algorithm of FIG. 8 may use mounted cameras to photograph each meal at checkout counters and transmit image information to a regional aggregating server that executes the algorithm of FIG. 8. In step 802, it is determined if any of the cameras have transmitted a picture to the regional aggregating server. If in step 802, it is determined that none of the cameras have transmitted a picture to the regional aggregating server then step 802 is repeated. If is step 802, it is determined that one of the cameras has transmitted a picture to the regional aggregating server then in step 804 an image recognition process is used to determine food choices and servings. In step 808, the food choices and servings, a date stamp, and an ID for the regional aggregating server are placed in a fraud prevention object and transmitted to the central processing server (and an associated row is added to a fraud prevention table) and step 802 is repeated.

Figure 9:
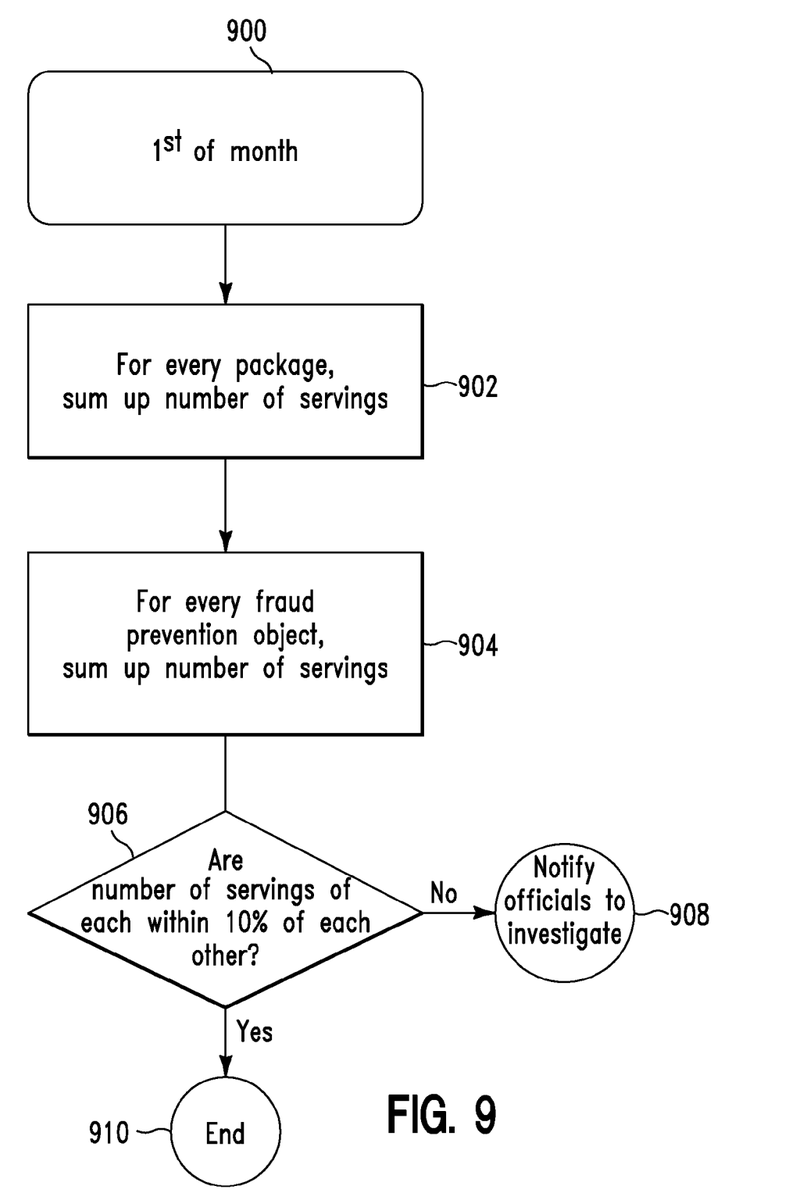
FIG. 9 illustrates an algorithm detailing a process flow enabled by the system of FIG. 4 for comparing garbage container data with photograph data to confirm that food purchased is equivalent to consumed food, in accordance with embodiments of the present invention.

FIG. 9 illustrates an algorithm detailing a process flow enabled by system 400 of FIG. 4 for comparing garbage container data with photograph data to confirm that food purchased is equivalent to consumed food, in accordance with embodiments of the present invention. In step 900, it is determined that it is the first day of the month (or any other specified starting date). In step 902, a number of servings for every food package are summed. In step 904, a number of servings for each fraud object are summed. In step 906, it is determined if each of the number of servings are within a specified percentage of each other (e.g., 10%). If in step 906 it is determined that each of the number of servings are not within a specified percentage of each other then in step 908 officials are notified for investigation. If in step 906 it is determined that each of the number of servings are within a specified percentage of each other then the process is terminated in step 910.

Figure 10:
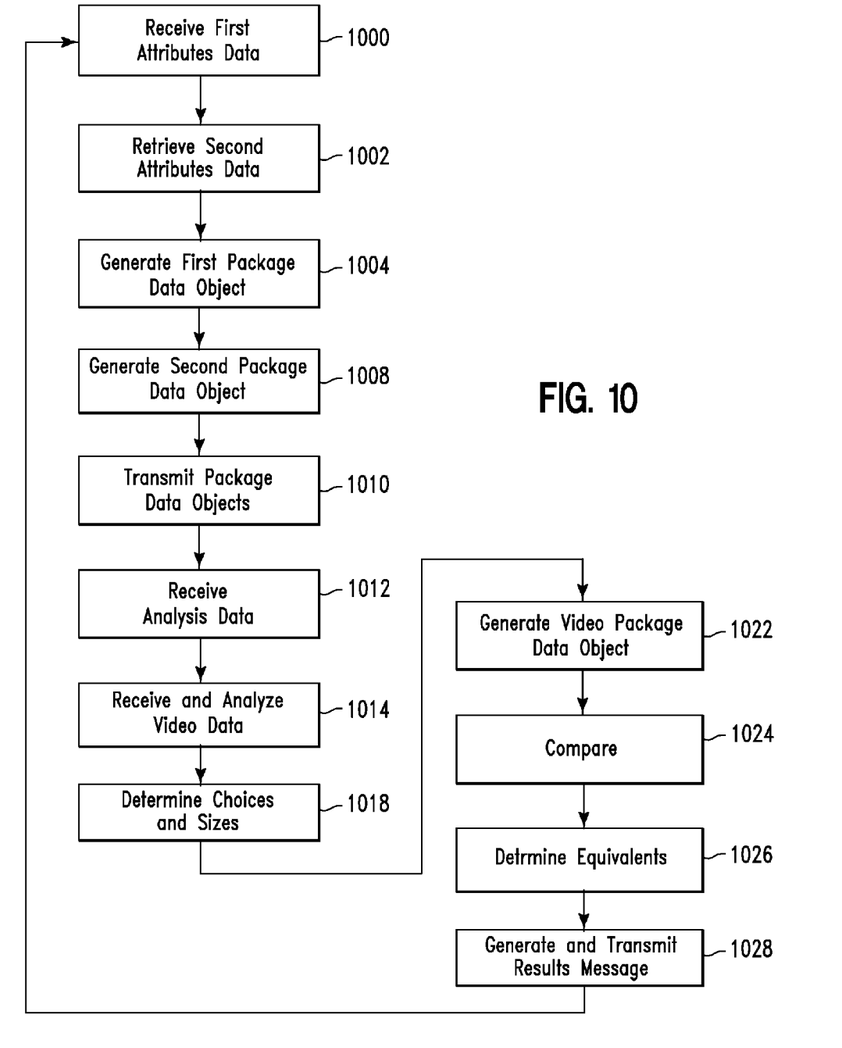
FIG. 10 illustrates an algorithm enabled by the system of FIG. 1 for automatically tracking use of food constituents in a food serving establishment to determine a nutritional value of served food, in accordance with embodiments of the present invention.

FIG. 10 illustrates an algorithm enabled by system 2 of FIG. 1 for automatically tracking use of food products in a food serving establishment to determine a nutritional value of served food, in accordance with embodiments of the present invention. In step 1000, a computer processor (of a regional computing system) retrieves (from a first plurality of empty food packages in a first garbage container) first data associated with first attributes of first consumed food products from the first plurality of empty food packages. In step 1002, the computer processor retrieves (from a second plurality of empty food packages in a second and differing garbage container) second data associated with second attributes of second consumed food products from the second plurality of empty food packages. In step 1004, the computer processor generates a first package data object associated with the first data. The first package data object comprises a first identification number and the first attributes. In step 1008, the computer processor generates a second package data object associated with the second data. The second package data object comprises a second identification number and the second attributes. In step 1010, computer processor transmits (to a central processing server) the first package data object and said second package data object. The central processing server generates aggregated data from the first package data object and the second package data object and performs an analysis of the first attributes and the second attributes with respect to nutritional content of the first consumed food products and the second consumed food products. The central processing server generates analysis data based on results of the analysis. In step 1012, the computer processor receives (from the central processing server) the analysis data. In step 1014, the computer processor receives (from a video retrieval device) and analyzes first video data representing the first consumed food products and the second consumed food products prior to consumption. In step 1018, the computer processor determines (based on results of the analysis of step 1014) food choices and serving sizes associated with the first consumed food products and the second consumed food products. In step 1022, the computer processor generates a video package data object associated with the first video data. The video package data object comprises a third identification number and video attributes. In step 1024, the computer processor compares the video package data object to the first package data object and the second package data object. In step 1026, the computer processor determines (based on results of step 1024) if food choices and serving sizes are equivalent to first attributes and second attributes. In step 1028, the computer processor generates a fraud warning message (if the food choices and serving sizes are not equivalent to the first attributes and the second attributes) indicating a potential fraud scenario associated with the first consumed food products and the second consumed food products. Alternatively, the computer processor generates a message (if the food choices and serving sizes are equivalent to the first attributes and the second attributes) indicating a no issues with the first consumed food products and the second consumed food products. The fraud warning message or the message is transmitted to the proper authorities and step 1000 is repeated.

Figure 11:
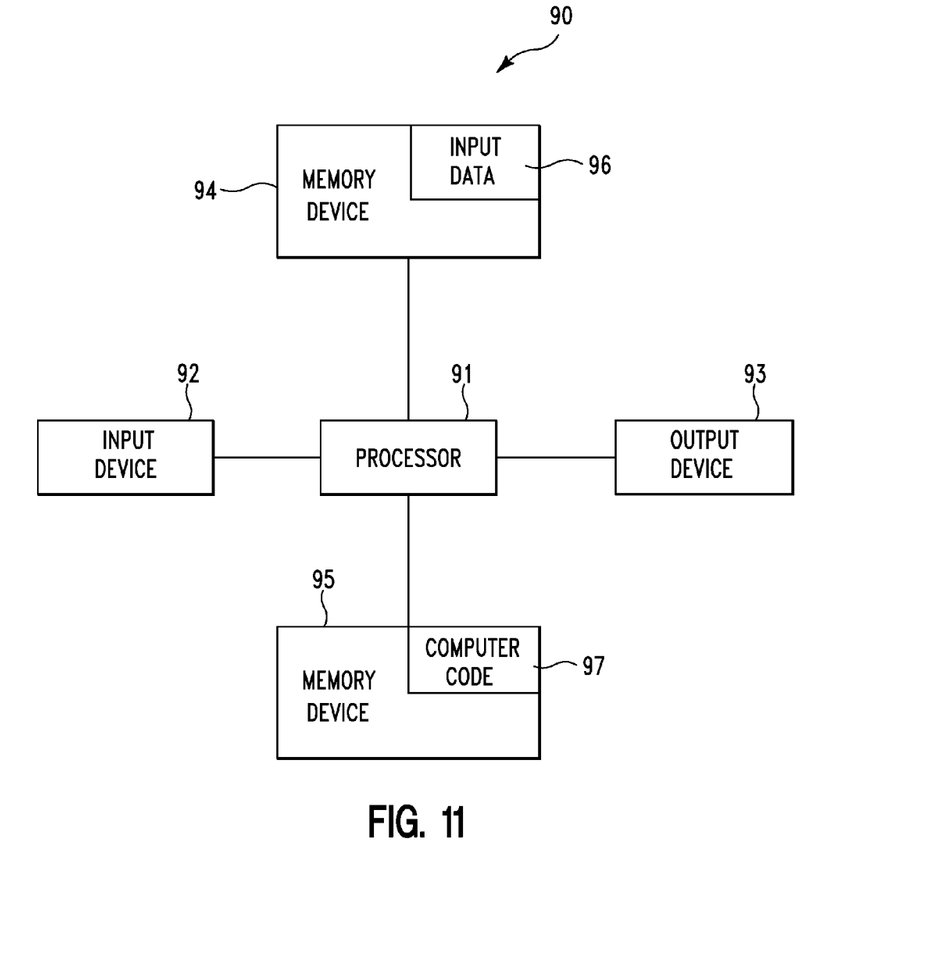
FIG. 11 illustrates a computer apparatus used by the systems of FIGS. 1 and 4 for automatically tracking use of food constituents in a food serving establishment to determine a nutritional value of served food, in accordance with embodiments of the present invention.

FIG. 11 illustrates a computer apparatus 90 used by systems 2 of FIG. 1 and 400 of FIG. 4 for automatically tracking use of food products in a food serving establishment to determine a nutritional value of served food, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2, 5-6, and 8-10) for automatically tracking use of food products in a food serving establishment to determine a nutritional value of served food. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 11) may comprise the algorithms of FIGS. 2, 5-6, and 8-10 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service supplier who offers to automatically track use of food products in a food serving establishment to determine a nutritional value of served food. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for automatically tracking use of food products in a food serving establishment to determine a nutritional value of served food. In another embodiment, the invention provides a business method that performs the process steps of the invention on a subscription, advertising, and/or fee basis. That is, a service supplier, such as a Solution Integrator, could offer to automatically track use of food products in a food serving establishment to determine a nutritional value of served food. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 11 shows the computer system 90 as a particular configuration of hardware and software, any configuration of hardware and software, as would be known to a person of ordinary skill in the art, may be utilized for the purposes stated supra in conjunction with the particular computer system 90 of FIG. 11. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:

retrieving, by a computer processor of a regional computing system from a first plurality of empty food packages in a first garbage container, first data associated with first attributes of first consumed food products from said first plurality of empty food packages;

retrieving, by said computer processor from a second plurality of empty food packages in a second garbage container, second data associated with second attributes of second consumed food products from said second plurality of empty food packages, wherein said first garbage container is located in a location differing from a location of said second garbage container;

generating, by said computer processor, a first package data object associated with said first data, wherein said first package data object comprises a first identification number and said first attributes;

generating, by said computer processor, a second package data object associated with said second data, wherein said second package data object comprises a second identification number and said second attributes;

transmitting, by said computer processor to a central processing server, said first package data object and said second package data object, wherein said central processing server generates aggregated data from said first package data object and said second package data object, wherein said central processing server performs an analysis of said first attributes and said second attributes of said aggregated data with respect to nutritional content of said first consumed food products and said second consumed food products, and wherein said central processing server generates analysis data based on results of said analysis;

receiving, by said computer processor from said regional computing system, said analysis data;

detecting, by said computer processor, trays of food products at a point of consumption for said first consumed food products and said second consumed food products prior to consumption, wherein a point of consumption is a physical location;

activating, by said computer processor in response to said detecting, a video retrieval device at said point of consumption;

receiving, by said computer processor from said video retrieval device in response to said activating, first video data representing said first consumed food products and said second consumed food products prior to consumption;

analyzing, by said computer processor, said first video data via image recognition;

first determining, by said computer processor based on results of said analyzing, food choices and serving sizes associated with said first consumed food products and said second consumed food products;

generating, by said computer processor, a video package data object associated with said first video data, wherein said video package data object comprises a third identification number and video attributes;

comparing, by said computer processor, said video package data object to said first package data object and said second package data object;

estimating, by said computer processor based on results of said comparing, an amount, type, and nutritional value of all food products served at said point of consumption during the course of a day;

determining, by said computer processor based on results of said estimating, monetary incentives with respect to providing food comprising said nutritional value; and second determining, by said computer processor based on results of said comparing, whether or not said food choices and serving sizes are equivalent to said first attributes and said second attributes to determine fraudulent behavior.

2. The method of claim 1, wherein said second determining determines that said food choices and serving sizes are not equivalent to said first attributes and said second attributes, and wherein said method further comprises:

generating, by said computer processor, a fraud warning message indicating a potential fraud scenario associated with said first consumed food products and said second consumed food products; and transmitting, by said computer processor, said fraud warning message to associated personnel.

3. The method of claim 1, wherein said second determining determines that said food choices and serving sizes are not equivalent to said first attributes and said second attributes, and wherein said method further comprises:

determining, by said computer processor based on results of said comparing that said food choices and serving sizes are not within a specified percentage of said first attributes and said second attributes;

generating, by said computer processor, a fraud warning message indicating a potential fraud scenario associated with said first consumed food products and said second consumed food products; and transmitting, by said computer processor, said fraud warning message to associated personnel.

4. The method of claim 1, wherein said second determining determines that said food choices and serving sizes are equivalent to said first attributes and said second attributes, and wherein said method further comprises:

generating, by said computer processor, a message indicating no issues with said first consumed food products and said second consumed food products; and transmitting, by said computer processor, said message to associated personnel.

5. The method of claim 1, wherein analyzing said first video data comprises performing an image recognition process to determine said food choices and serving sizes.

6. The method of claim 1, wherein said first attributes and said second attributes comprises attributes selected from the group consisting of volume, serving size, calories, and vitamin content.

7. The method of claim 1, further comprising:

executing a process for supporting computing infrastructure, the process comprising providing at least one support service for at least one of creating, integrating, hosting, maintaining, and deploying computer-readable code in a computer comprising a processor, wherein the processor carries out instructions contained in the code causing the computer to perform the method of claim 1.

8. A computer program product, comprising a computer readable storage device storing a computer readable program code, said computer readable program code comprising an algorithm that when executed by a computer processor of a regional computing system implements a method, said method comprising:

retrieving, by said computer processor from a first plurality of empty food packages in a first garbage container, first data associated with first attributes of first consumed food products from said first plurality of empty food packages;

retrieving, by said computer processor from a second plurality of empty food packages in a second garbage container, second data associated with second attributes of second consumed food products from said second plurality of empty food packages, wherein said first garbage container is located in a location differing from a location of said second garbage container;

generating, by said computer processor, a first package data object associated with said first data, wherein said first package data object comprises a first identification number and said first attributes;

generating, by said computer processor, a second package data object associated with said second data, wherein said second package data object comprises a second identification number and said second attributes;

transmitting, by said computer processor to a central processing server, said first package data object and said second package data object, wherein said central processing server generates aggregated data from said first package data object and said second package data object, wherein said central processing server performs an analysis of said first attributes and said second attributes of said aggregated data with respect to nutritional content of said first consumed food products and said second consumed food products, and wherein said central processing server generates analysis data based on results of said analysis;

receiving, by said computer processor from said regional computing system, said analysis data;

detecting, by said computer processor, trays of food products at a point of consumption for said first consumed food products and said second consumed food products prior to consumption, wherein a point of consumption is a physical location;

activating, by said computer processor in response to said detecting, a video retrieval device at said point of consumption;

receiving, by said computer processor from said video retrieval device in response to said activating, first video data representing said first consumed food products and said second consumed food products prior to consumption;

analyzing, by said computer processor, said first video data via image recognition;

first determining, by said computer processor based on results of said analyzing, food choices and serving sizes associated with said first consumed food products and said second consumed food products;

generating, by said computer processor, a video package data object associated with said first video data, wherein said video package data object comprises a third identification number and video attributes;

comparing, by said computer processor, said video package data object to said first package data object and said second package data object;

estimating, by said computer processor based on results of said comparing, an amount, type, and nutritional value of all food products served at said point of consumption during the course of a day;

determining, by said computer processor based on results of said estimating, monetary incentives with respect to providing food comprising said nutritional value; and second determining, by said computer processor based on results of said comparing, whether or not said food choices and serving sizes are equivalent to said first attributes and said second attributes to determine fraudulent behavior.

9. The computer program product of claim 8, wherein said second determining determines that said food choices and serving sizes are not equivalent to said first attributes and said second attributes, and wherein said method further comprises:

generating, by said computer processor, a fraud warning message indicating a potential fraud scenario associated with said first consumed food products and said second consumed food products; and transmitting, by said computer processor, said fraud warning message to associated personnel.

10. The computer program product of claim 8, wherein said second determining determines that said food choices and serving sizes are not equivalent to said first attributes and said second attributes, and wherein said method further comprises:

determining, by said computer processor based on results of said comparing that said food choices and serving sizes are not within a specified percentage of said first attributes and said second attributes;

generating, by said computer processor, a fraud warning message indicating a potential fraud scenario associated with said first consumed food products and said second consumed food products; and transmitting, by said computer processor, said fraud warning message to associated personnel.

11. The computer program product of claim 8, wherein said second determining determines that said food choices and serving sizes are equivalent to said first attributes and said second attributes, and wherein said method further comprises:

generating, by said computer processor, a message indicating no issues with said first consumed food products and said second consumed food products; and transmitting, by said computer processor, said message to associated personnel.

12. The computer program product of claim 8, wherein analyzing said first video data comprises performing an image recognition process to determine said food choices and serving sizes.

13. The computer program product of claim 8, wherein said first attributes and said second attributes comprises attributes selected from the group consisting of volume, serving size, calories, and vitamin content.

14. A computer system comprising a computer processor coupled to a computer readable memory unit, said memory unit comprising instructions that when executed by the computer processor of a regional computing system implements a method comprising:

retrieving, by said computer processor from a first plurality of empty food packages in a first garbage container, first data associated with first attributes of first consumed food products from said first plurality of empty food packages;

retrieving, by said computer processor from a second plurality of empty food packages in a second garbage container, second data associated with second attributes of second consumed food products from said second plurality of empty food packages, wherein said first garbage container is located in a location differing from a location of said second garbage container;

generating, by said computer processor, a first package data object associated with said first data, wherein said first package data object comprises a first identification number and said first attributes;

generating, by said computer processor, a second package data object associated with said second data, wherein said second package data object comprises a second identification number and said second attributes;

transmitting, by said computer processor to a central processing server, said first package data object and said second package data object, wherein said central processing server generates aggregated data from said first package data object and said second package data object, wherein said central processing server performs an analysis of said first attributes and said second attributes of said aggregated data with respect to nutritional content of said first consumed food products and said second consumed food products, and wherein said central processing server generates analysis data based on results of said analysis;

receiving, by said computer processor from said regional computing system, said analysis data;

detecting, by said computer processor, trays of food products at a point of consumption for said first consumed food products and said second consumed food products prior to consumption, wherein a point of consumption is a physical location;

activating, by said computer processor in response to said detecting, a video retrieval device at said point of consumption;

receiving, by said computer processor from said video retrieval device in response to said activating, first video data representing said first consumed food products and said second consumed food products prior to consumption;

analyzing, by said computer processor, said first video data via image recognition;

first determining, by said computer processor based on results of said analyzing, food choices and serving sizes associated with said first consumed food products and said second consumed food products;

generating, by said computer processor, a video package data object associated with said first video data, wherein said video package data object comprises a third identification number and video attributes;

comparing, by said computer processor, said video package data object to said first package data object and said second package data object;

estimating, by said computer processor based on results of said comparing, an amount, type, and nutritional value of all food products served at said point of consumption during the course of a day;

determining, by said computer processor based on results of said estimating, monetary incentives with respect to providing food comprising said nutritional value; and second determining, by said computer processor based on results of said comparing, whether or not said food choices and serving sizes are equivalent to said first attributes and said second attributes to determine fraudulent behavior.

15. The computer system of claim 14, wherein said second determining determines that said food choices and serving sizes are not equivalent to said first attributes and said second attributes, and wherein said method further comprises:

generating, by said computer processor, a fraud warning message indicating a potential fraud scenario associated with said first consumed food products and said second consumed food products; and transmitting, by said computer processor, said fraud warning message to associated personnel.

16. The computer system of claim 14, wherein said second determining determines that said food choices and serving sizes are not equivalent to said first attributes and said second attributes, and wherein said method further comprises:

determining, by said computer processor based on results of said comparing that said food choices and serving sizes are not within a specified percentage of said first attributes and said second attributes;

generating, by said computer processor, a fraud warning message indicating a potential fraud scenario associated with said first consumed food products and said second consumed food products; and transmitting, by said computer processor, said fraud warning message to associated personnel.

17. The computer system of claim 14, wherein said second determining determines that said food choices and serving sizes are equivalent to said first attributes and said second attributes, and wherein said method further comprises:

generating, by said computer processor, a message indicating no issues with said first consumed food products and said second consumed food products; and transmitting, by said computer processor, said message to associated personnel.

* * * * *